United States Patent

Wu et al.

[11] Patent Number: 5,981,074
[45] Date of Patent: Nov. 9, 1999

[54] ONE-PACKAGE POLYURETHANE TOP COAT COMPOSITION

[75] Inventors: Kuang Jong Wu, Shelton; Feeha Lee, Fairfield, both of Conn.

[73] Assignee: Cytec Technology Corp., Wilmington, Del.

[21] Appl. No.: 08/247,958

[22] Filed: May 24, 1994

Related U.S. Application Data

[63] Continuation of application No. 08/002,391, Jan. 12, 1993, abandoned.

[51] Int. Cl.$^6$ .................................................... B32B 27/00
[52] U.S. Cl. .................................... 428/423.1; 428/425.8; 427/407.1; 427/409; 525/124; 525/127; 525/131; 525/157; 525/509; 525/520
[58] Field of Search ...................................... 525/124, 127, 525/131, 520, 157, 509; 427/409, 407.1; 428/423.1, 425.8

[56] References Cited

U.S. PATENT DOCUMENTS

| | | | |
|---|---|---|---|
| 3,954,900 | 5/1976 | Schmalz et al. | 260/850 |
| 4,719,132 | 1/1988 | Porter, Jr. | 427/409 |
| 4,846,946 | 7/1989 | Mauer et al. | 204/181.4 |
| 4,873,298 | 10/1989 | Ryntz | 525/479 |
| 5,155,201 | 10/1992 | Gardon et al. | 528/72 |
| 5,178,915 | 1/1993 | Moyle et al. | 427/318 |

FOREIGN PATENT DOCUMENTS

| | | |
|---|---|---|
| 0410365A2 | 1/1991 | European Pat. Off. . |
| 2265828 | 10/1975 | France . |
| 60-203685A | 10/1985 | Japan . |
| 2254328A | 10/1992 | United Kingdom . |
| WO92/07823 | 5/1992 | WIPO . |

OTHER PUBLICATIONS

International Search Report for International Patent Application No. PCT/US94/00431.

"High Solids Amino Crosslinking", brochure of American Cyanamid Company (1991).

Nylen and Sunderland, *Modern Surface Coatings*, Interscience Publishers (1965) pp. 189–196.

*Primary Examiner*—Stevan A. Resan
*Attorney, Agent, or Firm*—Michelle A. Sherwood; Michael J. Kelly; Claire M. Schultz

[57] ABSTRACT

A non-yellowing one-package polyurethane coating composition containing an oxime-blocked polyisocyanate, an isocyanate-reactive material, and an imino-functional amino resin is provided. The coating composition is applied onto an acid-cured base coat and cured. The clear coat produced in this manner has good yellowness resistance and intercoat adhesion.

Articles such as multi-layered coated substrates are prepared using the coating method of this invention. The coated substrates typically contain an acid-cured first layer and an adjacent layer derived from a curable composition containing an oxime-blocked polyisocyanate, an isocyanate-reactive material, and an imino-functional amino resin.

32 Claims, No Drawings

ONE-PACKAGE POLYURETHANE TOP COAT COMPOSITION

This application is a continuation of U.S. application Ser. No. 08/002,391, filed Jan. 12, 1993, now abandoned.

BACKGROUND OF THE INVENTION

1. Field of the Invention

This invention is an improvement in multi-layer coatings and methods of coating which utilize catalysts in one layer and blocked isocyanates in an adjacent layer.

2. Description of the Related Art

Modern automotive and appliance finishes are frequently two-layer coatings where a pigmented base coat is enhanced by covering with a clear top coat. In such multi-layer systems it is highly desirable that the top coat adhere strongly to the base coat and that the top coat not develop objectionable color.

Top coat color development and/or poor adhesion of the top coat to the base coat is a particular problem in two-layer coatings wherein one layer contains an acidic component and the adjacent layer contains a blocked isocyanate. This situation typically occurs where the base coat is crosslinked with amino resin type crosslinkers using acid catalysts and the top coat is a "one-package" polyurethane coating containing a blocked isocyanate wherein the blocking agent is released during heat curing. Surprisingly, it has been found that the addition of an amino resin with at least one imino-functional (—NH—) group to curable compositions which form polyurethane top coat layers adjacent acid-cured amino resin coating layers is highly beneficial for improvement of color and/or adhesion.

SUMMARY OF THE INVENTION

This invention is a curable composition comprising:
(i) a blocked polyisocyanate;
(ii) an isocyanate-reactive material; and
(iii) an imino-functional amino resin.

The curable composition is non-yellowing. When cured, it produces coatings with low yellowness, particularly when the coating is adjacent an acid-cured base coat.

This invention is also a method of coating substrates, comprising:
(I) applying onto an acid-cured first coating layer, an adjacent coat of the curable composition of the invention; and thereafter
(II) curing said composition.

This invention is also a multi-layered coated substrate, comprising:
(1) an acid-cured first layer; and
(2) a cured polyurethane adjacent layer derived from the one-package polyurethane curable composition of the invention.

DETAILED DESCRIPTION OF THE PREFERRED EMBODIMENTS

This invention is a curable one-package polyurethane composition containing a blocked polyisocyanate to which has been added an amino resin having at least one imino functionality. The composition is applied onto an acid-cured base coat to produce, after curing, a clear coat with low yellowness.

This invention is also a multi-layer coating method using the coating composition of the invention.

This invention is also a multi-layer coated article having adjacent layers wherein one layer has an acidic component and an adjacent layer has a blocked isocyanate wherein the blocking agent has been substantially released upon cure.

In the multi-layer coatings of this invention the polyurethane coating usually has the role of a clear top coat. However, in the broader context of this invention the polyurethane layer may be any coating stratum which is adjacent a coating layer containing one or more acidic components.

While this invention is not bound by any theory of operation, it is thought that the blocking agents released upon heat cure of the polyurethane coating layer react over a period of time with acidic components in adjacent layers to give poor interlayer adhesion and undesirable yellowing.

The polyurethane one-package coating composition of the invention has the following essential ingredients:
1. a blocked polyisocyanate
2. an isocyanate-reactive material, and
3. an imino-functional amino resin.

The Blocked Polyisocyanate Ingredient

In general, the blocked polyisocyanate ingredient is an adduct formed by adding a suitable blocking agent to some or all of the free isocyanate groups of a polyisocyanate, to thereby make the isocyanate groups inactive. When the adduct is heated to elevated temperatures, and/or put into contact with catalysts, the blocking agent readily dissociates from the isocyanate groups to regenerate free isocyanate groups. Such blocked polyisocyanates are already known. For example, they are described in Japanese Patent No. 91-068915.

The blocked polyisocyanate ingredient may be fully blocked (i.e., no free isocyanate groups remaining), or it may be a mixture of blocked and unblocked isocyanates, sometimes referred to herein as partially blocked isocyanates. The fully or partially blocked polyisocyanates usable in the improved one-package coating composition of the invention are further described below.

The coating composition of the invention contains either a blocked polyisocyanate whose isocyanate groups are blocked with an oxime, or a blocked polyurethane prepolymer whose terminal isocyanate groups are blocked with an oxime.

Any polyisocyanate is usable to form the partially or fully blocked polyisocyanate. Thus, the polyisocyanate may be, for example, an aromatic, aliphatic, aromatic-aliphatic or alicyclic polyisocyanate.

Typical aromatic polyisocyanates include 1,3-phenylene diisocyanate, 1,4-phenylene di-isocyanate, 4,4'-diphenyldiisocyanate, 4,4'-diphenylmethane diisocyanate, 2,4-tolylene diisocyanate, 2,6 tolylene diisocyanate, 4,4'-toluidine diisocyanate, dianisidine diisocyanate, 4,4'-diphenylether diisocyanate, 4,4',4'-triphenylmethane triisocyanate, 1,3,5-triisocyanatobenzene and 2,4,6-triisocyanatotoluene. Typical aliphatic polyisocyanates include trimethylene diisocyanate, tetramethylene diisocyanate, hexamethylene diisocyanate, pentamethylene diisocyanate, 1,2-propylene diisocyanate, 2,3-butylene diisocyanate, 1,3-butylene diisocyanate, 2,4,4- or 2,2,4-trimethylhexamethylene diisocyanate and methyl 2,6-diisocyanatocaproate. Typical aromatic-aliphatic polyisocyanates include ω,ω'-diisocyanato-1,3-dimethylbenzene, ω,ω'-diisocyanato-1,4-dimethylbenzene, ω,ω-diisocyanato-1,4-diethylbenzene, 1,3-tetramethylxylylene diisocyanate and 1,4-tetramethylxylylene diisocyanate. Typical alicyclic polyisocyanates include 1,3-cyclopentane diisocyanate, 1,4-cyclopentane diisocyanate, 1,4-cyclohexane diisocyanate, 1,3-cyclohexane diisocyanate, 3-isocyanatomethyl-3,5,5-trimethylcyclohexyl isocyanate, 4,4'-methylenebis-(cyclohexylisocyanate), methyl-2,4-cyclohexane diisocyanate, methyl-2,6-cyclohexane diisocyanate, 1,4-bis (isocyanatomethyl) cyclohexane and 1,3-bis (isocyanatomethyl)cyclohexane. These polyisocyanates may be used singly or as a mixture.

Additionally, copolymers of isopropenyl-alpha, alpha-dimethylbenzyl isocyanate, particularly hydroxyethyl acrylate and methacrylate containing ω polymers thereof may be advantageously used to form the blocked polyisocyanate. Also usable are trimethylol propane adducts of the above-mentioned polyisocyanates as well as trimerized isocyanurate derivatives thereof. Polymeric polyisocyanates are also usable to form the blocked polyisocyanate, e.g., dimers or trimers of the diisocyanates as above-mentioned, polymethylene polyphenylene polyisocyanates, or modified derivatives such as with carbondiimide.

The polyurethane prepolymer used in the invention has terminal isocyanate groups in the molecule, and is obtained by the reaction of a polyisocyanate, such as those mentioned above with a polyhydric alcohol or a polyol, in amounts such that the isocyanate groups of the polyisocyanate are in molar excess to the number of hydroxyls of the polyhydric alcohol or polyol. The preferred isocyanate/hydroxyl equivalent ratios are about 1.2–5.0.

The polyol used has at least two reactive hydrogens in the molecule, and has a molecular weight preferably in the range of about 62 to about 100,000. The polyol used includes, for example, polyesterpolyols, polyetherpolyols, polyetheresterpolyols, polyesteramidepolyols, acrylic polyols, polyurethanepolyols, polycarbonatepolyols, epoxy polyols, epoxy-modified polyols, polyhydroxylalkanes, alkyd-modified polyols, castor oil, and mixtures of these.

The production of polyurethane prepolymers using polyols and polyisocyanates is well known in the art. By way of example, a polyol and a polyisocyanate are reacted usually at temperatures of about 0 to 200° C., either in the presence or absence of a solvent. If desired, any known catalyst, such as tertiary amines, metal salts or organometallic compounds, is used.

A variety of polyesterpolyols are usable for the production of prepolymers, however, the reaction products of polyhydric alcohols and polybasic carboxylic acids are preferred. Preferred alcohols include diethylene glycol, ethylene glycol, neopentyl glycol, propylene glycol, trimethylolpropane, trimethylolethane and 2,2,4-trimethyl-1,3-pentanediol. Preferred acids include adipic acid, isophthalic acid, maleic anhydride, phthalic anhydride and terephthalic acid.

The oxime used as a blocking agent includes, for example, formaldoxime, acetaldoxime, acetoxime, methyl ethyl ketoxime, methyl isopropyl ketoxime, methyl butyl ketoxime, diethyl ketoxime, diacetyl monooxime, cyclohexanone oxime, benzophenone oxime and the like. Mixtures of two or more of these oximes may be used, if necessary. Among these oximes, methyl ethyl ketoxime and cyclohexanone oxime are particularly preferred.

The blocked polyisocyanate or polyurethane prepolymer used in the invention is obtained by reacting a polyisocyanate or a polyurethane prepolymer with a blocking agent in the conventional manner. The reaction may be carried out either in a solvent which has no active hydrogen or in the absence of a solvent. The solvent having no active hydrogen is exemplified by esters such as ethyl acetate, butyl acetate, cellosolve acetate, carbitol acetate or dimethylesters of dibasic acids; ketones such as methyl ethyl ketone, methyl isobutyl ketone or cyclohexanone; and aromatic hydrocarbons such as toluene, xylene, Aromatic 100 or Aromatic 150 (the last two compounds, products of Exxon Chemical, are aromatic solvents having 99.7% aromatics and 99.6% aromatics, respectively).

When necessary, a known catalyst may be used in the blocking reaction. Such catalysts include, for example, tertiary amines, and organotin compounds such as dibutyltin dilaurate, dibutyltin oxide, dibutyltin dichloride or tetrabutyl-1,3-diacetoxydistannoxane. The reaction temperature is usually in the range of about 30 to 200° C. After the polyisocyanate or prepolymer has been completely blocked, the blocked polyisocyanate or prepolymer may be diluted with a solvent having active hydrogen in the molecule.

The Isocyanate-Reactive Material

The isocyanate-reactive materials usable in the invention are polyfunctional active hydrogen-containing materials capable of bonding chemically to a polyisocyanate.

The isocyanate-reactive material comprises at least one class of active hydrogen functionality selected from the group consisting of hydroxy, amino, mercapto (such as thioglycerol), carboxy (such as polyacrylic acid or carboxy-functional polyesters), and a group convertible thereto. The hydroxy- and amino-functional groups are preferred.

Especially suitable isocyanate-reactive materials include hydroxy-functional polyesters, polyacrylates, and polyurethane prepolymers. The polyesters may be obtained in a known manner by, for example, the reaction of polycarboxylic acids with excess quantities of polyhydric alcohols. The polyacrylates may be obtained by the copolymerization of acrylic and methacrylic acid derivatives with hydroxy group-containing derivatives of these acids, such as, for example, hydroxyalkyl esters of acrylic and methacrylic acids, optionally with the simultaneous use of additional vinyl compounds, such as, for example, styrene. The hydroxy-functional polyurethane prepolymers may be obtained in a known manner, by the reaction of polyisocyanates with excess quantities of compounds containing at least two hydroxy groups.

The amino-functional isocyanate-reactive material comprises compounds and resins selected from diamines such as ethylene diamine or hexamethylene diamine, from triamines such as diethylene triame, tetramines such as triethylene tetramine, polyamines such as polyallylamine, and mixtures thereof.

The Imino-Functional Amino Resin

Amino resins are polymers made by combining an aldehyde with a compound containing an amino group, and optionally thereafter etherifying with an alcohol, provided that at least one imino-functional group, or a group convertible thereto, such as an N-methylol group, remains in the final product. The imino-functional amino resins prepared by this method may be monomeric or oligomeric, both of which are usable as the imino-functional amino resin ingredient of this invention. Examples of common imino-functional resins are those derived from melamines, guanamines, glycolurils, and ureas. Melamine-derived amino resins are preferred.

The imino-functional amino resin found to have utility in the practice of this invention are ureaformaldehyde resins containing imino groups and those having imino groups pendent on nitrogen containing heterocyclic nuclei selected from the group consisting of melamine, oligomers of melamine, benzoguanamine, oligomers of benzoguanamine, glycoluril, oligomers of glycoluril, cyclohexylcarboguanamine, oligomers of cyclohexylcarboguanamine, acetoguanamine, oligomers of acetoguanamine, dihydroxyethyleneurea, and mixtures thereof. The preferred imino-functional materials are those based on melamine and oligomers of melamine.

The imino-functional amino resin ingredient functions as a crosslinking agent and also serves to inhibit the deleterious effects of highly acidic components that come into contact with the polyurethane.

The term "imino-functional" means an amino resin with an average —NH— content of about 3.0 to about 35.7 weight percent, and preferably from about 5.0 to about 25.0 weight percent, based on the weight of the amino resin. It is recognized that suitable imino-functional amino resins are typically a statistical distribution of resins of various degrees of substitution and molecular weight range. It is only necessary that in mixtures of resins the average imino content be in the range described. The imino content of the amino resin may be easily calculated if the chemical formula is known, or may be determined by titration. Accordingly, an amino resin is considered to have sufficient imino content if its calculated or determined "—NH—" content is within the above ranges.

An N-methylol functionality within the context of this invention is to be considered an "imino" functionality because under acid cure conditions it is convertible to an "NH" functionality by demethylolation.

Examples of some imino-functional resins usable in this invention are partially methylated, partially butylated and mixed partially methylated/butylated resins such as CYMEL® 323 resin, CYMEL® 324 resin, CYMEL® 325 resin, CYMEL® 327 resin, CYMEL® 370 resin, CYMEL® 373 resin, CYMEL® 380 resin, CYMEL® 385 resin and CYMEL® 1158 resin. The CYMEL® resins are products of American Cyanamid Co., Wayne, N.J. The CYMEL® 323, 324, 325 and 327 resins are methoxymethyl-imino-functional and are partially methylolated and highly methylated. The CYMEL® 370, 373, 380 and 385 resins are methoxymethyl-methylol functional. The CYMEL® 1158 resin is butoxymethyl-imino-functional. The CYMEL® 1158 resin is butoxymethyl-imino-functional.

An example of a substantially methylolated, partially etherified, substantially oligomeric melamine is CYMEL® 370 resin.

An example of a partially methylolated but substantially fully etherified and substantially oligomeric. melamine is CYMEL® 325 resin.

An example of a substantially monomeric imino-functional resin is CYMEL® 323. The formula that typifies CYMEL® 323 is substantially that of mono-N-methylol-N,N',N"-tri(methoxymethyl) melamine, wherein the N-methylol group is convertible to an "—NH—" group under the acidic conditions used to cure the compositions of the invention.

Optional Ingredients

In order to accelerate the crosslinking reaction between the blocked polyisocyanate and the isocyanate-reactive material, a cure catalyst may also be optionally used. However, the coating composition of the invention is capable of curing without the aid of an added catalyst. The cure catalysts usable are those widely used in polyurethanes and amino resins including bases such as 2,2,2-diazabicyclooctane (DABCO), organometallic compounds, particularly organotin compounds such as dibutyltin dilaurate, dimethyltin dilaurate, tetrabutyldiacetoxydistannoxane (TBDAS), and acids such as p-toluene sulfonic acid.

Optional ingredients such as pigments, fillers, stabilizing additives, surface active agents, flow control agents may be additionally used to impart certain desirable properties to the coatings of this invention.

Proportions of Ingredients

The components of the one-package polyurethane composition of this invention are used in proportions well-known for such systems in the art. This typically requires that they be uniformly mixed so that the stoichiometric ratio of blocked isocyanate groups and isocyanate-reactive groups is in the range of about 1.2:1 to about 0.8:1, and preferably about 1:1.

The imino-functional amino resin is added in an amount sufficient to enhance adhesion and/or reduce yellowing when the composition forms a polyurethane coating over an acidic layer. Typically, from about 0.1 weight percent to about 30 weight percent (and preferably from about 5 weight percent to about 25 weight percent) of the imino-functional resin is added, based on the weight of all resin-forming ingredients in the polyurethane coating.

An imino-functional resin may be used as the sole crosslinker in the base coat. It may also be used in combination with a crosslinker which is free of any imino functionalities. CYMEL® 303 resin, a product of American Cyanamid Company, Wayne, N.J., is an example of a substantially fully alkoxymethylated amino resin substantially free of imino-functional groups. In the latter case, the ratio of the substantially fully alkoxymethylated amino resin to imino-functional amino resin is from about 19:1 to about 3:1.

Coating Method

The coating method of the invention comprises:
(I) applying, onto a substrate, a one-package polyurethane coating composition, comprising:
  (i) an oxime-blocked polyisocyanate;
  (ii) an isocyanate-reactive material; and
  (iii) an imino-functional amino resin; and thereafter
(II) curing said one-package polyurethane coating composition.

The one-package polyurethane coating composition may additionally comprise a cure catalyst, such as an acid catalyst, to crosslink the imino-functional amino resin with an amino resin reactive material such as a hydroxy- or carboxy-functional acrylic or polyester resin and the like, or an organotin compound or a base to accelerate the polyurethane forming reactions.

To employ the method of the invention, a substrate is typically coated with multiple layers. For example, a layer containing highly acidic catalysts is adjacent a one-package polyurethane layer which contains a blocked isocyanate. The number or order of the applied layers is not critical. However, in conventional use a substrate of choice such as steel, plastic, or wood is first coated with an amino resin crosslinked base coat and cured. The base coat is thereafter topcoated with a one-package polyurethane coating composition (usually clear) and given a final cure. The coating method comprises using as the polyurethane top coat the novel polyurethane coating composition of the invention.

The base coat contains an acidic ingredient such as a strong acid catalyst and/or a resin containing carboxyl groups capable of acting as an acid catalyst. For the purposes of this invention, an acid catalyst is an acid with a $pK_a$ of less than 5 and includes Lewis acids of any strength. Examples of acid catalysts are p-toluene sulfonic acid, dinonylnaphthalene disulfonic acid, dodecylbenzene sulfonic acid, oxalic acid, maleic acid, methyl p-tolyl sulfonimide, and latent forms thereof.

Isocyanate-reactive polyol resins having acid numbers of at least one may in whole or in part replace common acid catalysts. Examples of such acidic resins are carboxy group-containing acrylic and polyester resins.

The acid-cured layer, which is the base coat, is typically derived from a substantially fully alkoxymethylated amino resin such as CYMEL® 303 resin, having the chemical name hexamethoxymethyl melamine. Other hexaalkoxymethyl melamines usable in the method of the invention have alkyl groups of 1 to 12 carbon atoms, including methyl, ethyl, 1-propyl, 2-propyl, 1-butyl, 2-butyl, iso-butyl, and mixtures thereof.

Alternatively, the acid-cured layer, which is the base coat, may be entirely derived from an imino-functional amino resin crosslinker. It may also be derived from a mixture of a substantially fully alkoxymethylated amino resin and any of the imino-functional amino resins.

The curable composition of the invention may be used, without a base coat, as a curable coating composition on a metal, wood, glass, or plastic substrate. It may also be used for application, as a top coat, onto base coats which are cured under neutral conditions or are cured with an acid or a base. The preferred use of the curable composition, however, is its use as a polyurethane top coat for application onto an acid-cured base coat such as those derived from amino resins which are not imino-functional, such as CYMEL® 303 resin. Alternatively, it may be used on a base coat derived from an imino-functional amino resin such as CYMEL® 323, CYMEL® 324, CYMEL® 325, CYMEL® 327, CYMEL® 370, CYMEL® 373, CYMEL® 380, CYMEL® 385 and CYMEL® 1158, particularly in cases where the base coat is not acid-cured. Also particularly useful is the use of the curable composition of the invention as a polyurethane top coat applied over an acid-cured base coat derived from a mixture of a resin which is not imino-functional, such as CYMEL® 303 resin, and a resin which is imino-functional, such as CYMEL® 327 resin.

The preferred polyurethane top coat is a clear one-package oxime-blocked curable composition containing an imino-functional amino resin. More specifically, the coating method of the invention comprises:

(a) applying onto a substrate, as a first coat, an acid-curable coating composition;

(b) curing said curable coating composition to produce a first layer;

(c) applying onto said first layer an adjacent coat of a one-package polyurethane coating composition, comprising:
(i) an oxime-blocked polyisocyanate;
(ii) an isocyanate-reactive material; and optionally
(iii) an imino-functional amino resin; and thereafter (d) curing said one-package polyurethane coating composition to produce a coated substrate having an acid-cured first layer and an oxime-blocked polyisocyanate derived adjacent layer;

with the proviso that at least one of the acid-cured first coat and the one-package adjacent polyurethane top coat contains an imino-functional amino resin.

In the practice of the method of the invention, a two-layered coating is prepared as follows. An acid-cured coating composition is first applied. Thereafter, a one-package oxime-blocked polyurethane coating composition is applied; however, before the application thereof, the first-applied acid-curable composition is fully or partially cured.

It is the discovery of this invention that yellowness resistance and intercoat adhesion of multi-layered coatings are improved by incorporating in a first acid-cured layer, or in an adjacent oxime-blocked polyisocyanate derived layer, or in both the first and adjacent layers, an imino-functional amino resin to counter the deleterious effect of residual acids used for curing.

A significant aspect of this invention is exemplified when the first applied coating composition is partially cured before the oxime-blocked one-package polyurethane coating composition is applied. This approach is referred to herein as the "wet on wet" method of coating substrates. In this method of coating, yellowing is a more severe problem than it is in the "wet on dry" approach in which the base coat is first substantially fully cured. This is due to the greater facility of the residual acids to migrate from the base coat to an adjacent coat thereby causing severe yellowing in "wet on wet" systems.

In accordance with the method of this invention, the "wet on wet" yellowing problem is overcome by incorporating an imino-functional amino resin in the first layer, in the adjacent layer, or in both the first and adjacent layers of multi-layered coatings.

Coated Substrates

The practice of the method of the invention as set out in the preceding section produces a novel article which has a multi-layer coating that is highly resistant to yellowing and has improved adhesion.

EXAMPLE 1

The imino functionality of an imino-functional amino resin may be determined as follows:

Place 12 g of the imino-functional amino resin into a 100 ml beaker. Add 8 g of methanol. Dissolve the resin. Insert the electrodes of a pH meter, allowing about a minute for equilibrium to be established. With stirring, add Catalyst 1010 (i.e., a 10% solution of p-toluene sulfonic acid) from a burette placed above the beaker to lower the pH of the resin solution to 1.00 at 25° C. Calculate the imino content from the amount of acid used, by known methods.

EXAMPLE 2

Formulations A, B, C, D, and E were prepared as described in TABLE 2. Each formulation was applied to two white-basecoated Bonderite 100 (zinc phosphate-treated) cold roll steel (CRS) panels to produce two sets of five coated panels. The first set of five coated panels was thereafter heated in a vented oven at 125° C. for 30 minutes and the second set was heated at 150° C. also for 30 minutes. The physical and resistance properties of the cured coatings produced in this manner are summarized in TABLE 1. The JONCRYL® 500 resin is an acrylic oligomer made by S. C. Johnson & Son, Inc., Racine, Wis.

Coating A, which does not use any urethane as a crosslinking agent, exhibits the least amount of yellowing.

Coating B employs a fully alkoxymethylated melamine crosslinker such as CYMEL® 303 resin, in combination with an oxime-blocked polyisocyanate such as BI-12 blocked polyisocyanate crosslinker, also available from American Cyanamid Company. BI-12 is an adduct of methyl ethyl ketone oxime-blocked meta-tetramethylxylylene diisocyanate and trimethylolpropane in a molar ratio of approximately 3:1. Coating B exhibits the highest level of yellowing, particularly at the higher cure temperature of 150° C. Coating B illustrates the yellowing problem observed when CYMEL® 303 and an oxime-blocked polyisocyanate are used in combination.

Coatings C, D, and E illustrate the solution of the yellowing problem by incorporating into the formulation an imino-functional amino resin such as CYMEL® 325 crosslinker in combination with BI-12 (Coating C), or DES B 3175 (Coating D), or IPDI B 1370 (Coating E). DES B 3175 is methyl ethyl ketone oxime-blocked tris-isocyanatohexyl isocyanurate, a product of Meyers Corporation. IPDI B 1370 is methyl ethyl ketone oxime-blocked cycloaliphatic polyisocyanate, a product of Huels.

It is evident from the yellowing index of Coatings C, D, and E that incorporation of an imino-functional amino resin such as CYMEL® 325 provides an effective solution to the yellowing problem arising from the use of CYMEL® 303 and an oxime-blocked polyisocyanate in combination.

TABLE 1

ADDITION OF AN IMINO-FUNCTIONAL MELAMINE RESIN TO A ONE-PACKAGE URETHANE TOP COAT* TO REDUCE YELLOWING

| FORMULATION** | A | B | C | D | E |
|---|---|---|---|---|---|
| JONCRYL® 500 | 65 | 65 | 65 | 65 | 65 |
| CYMEL® 303 | — | 20 | — | — | — |
| CYMEL® 325 | 35 | — | 20 | 20 | 20 |
| BI-12 | — | 15 | 15 | — | — |
| DES B3175 | — | — | — | 15 | — |
| IPDI-B1370 | — | — | — | — | 15 |
| T-12 (Dibutyltindilaurate) | — | 0.5 | 0.5 | 0.5. | 0.5 |
| pTSA (p-Toluenesulfonic acid) | 0.4 | 0.4 | 0.4 | 0.4 | 0.4 |
| COATING PERFORMANCE | | | | | |
| 125° C./30 MIN. | | | | | |
| Film Thickness, mils | 1.3 | 1.3 | 1.4 | 1.4 | 1.37 |
| Film Thickness, mm | 0.033 | 0.033 | 0.036 | 0.036 | 0.035 |
| Hardness, KHN$_{25}$ | 12.4 | 11.8 | 12.2 | 7.4 | 13.2 |
| MEK Rubs | 200+ | 75/200+ | 50/200+ | 145/175 | 50/200+ |
| Yellowing Index*** | −4.2 | +0.1 | −3.3 | −3.3 | −3.5 |
| 150° C./30 MIN. | | | | | |
| Film Thickness, mils | 1.2 | 1.3 | 1.3 | 1.3 | 1.3 |
| Film Thickness, mm | 0.033 | 0.033 | 0.033 | 0.033 | 0.033 |
| Hardness, KHN$_{25}$ | 14.9 | 12.2 | 14.3 | 13.0 | 14.4 |
| MEK Rubs | 200+ | 200+ | 200+ | 200+ | 200+ |
| Yellowing Index*** | −4.11 | +25.76 | −2.47 | −2.35 | −3.19 |

*SUBSTRATE: Acid-cured white base coated Bonderite 100 CRS.
**To each formulation an organic coating solvent was added to produce a solution having a solids content of 50 weight percent. The solvent was a mixture of propylene glycol monomethyl ether acetate (PMA), methyl isobutyl ketone (MIBK) and xylene in a 50/50/20 mixture by weight.
***ASTM D 1638-74 method.

EXAMPLE 3

The procedure of EXAMPLE 2 was repeated using the formulations described in TABLE 2. After curing, Formulations F and G produced the corresponding coatings. Coating F which contains an imino-functional amino resin and is produced by curing at 150° C. for 30 minutes has lower original yellowness and has lower increase in yellowness upon further heating under overbake conditions than coating G, which does not contain an imino-functional amino resin when subjected to the same cure/overbake conditions (TABLE 2). It is concluded, therefore, that the presence of an imino-functional amino resin such as CYMEL® 325 resin improves yellowing resistance of urethane top coats applied over an acid-cured base coat.

TABLE 2

ADDITION OF AN IMINO-FUNCTIONAL MELAMINE RESIN TO A POLYURETHANE TOP COAT TO IMPROVE YELLOWING RESISTANCE

FORMULATION

Base coat: JONCRYL ® 500/CYMEL ® 303/TiO$_2$*/p-TSA** = 65/35/100/0.3

| Clear coat: | F | G |
|---|---|---|
| JONCRYL ® 500 | 53.3 | 53.3 |
| BI-12 | 35.0 | 46.7 |
| CYMEL ® 325 Resin | 11.7 | 0.0 |
| T-12 (dibutyltin dilaurate) | 0.5 | 0.5 |

Substrate: Bonderite 100 treated CRS (Cold Roll Steel)
CURE SCHEDULE

Base coat: 110° C. for 20 minutes
Clear coat: 125° C. for 30 minutes
         150° C. for 30 minutes
COATING PERFORMANCE

| Bake schedule | 125° C./30 Min | | 150° C./30 Min | |
|---|---|---|---|---|
| Clear coat | F | G | F | G |
| Thickness, mils | 1.8 | 1.8 | 1.9 | 1.8 |
| Thickness, mm | 0.046 | 0.046 | 0.048 | 0.046 |
| Hardness, KHN$_{25}$ | 8.0 | 9.5 | 11.7 | 12.4 |
| Bake schedule | 125° C./30 Min | | 150° C./30 Min | |
| Clear coat | A | B | A | B |
| Thickness, mils | 1.8 | 1.8 | 1.9 | 1.8 |
| Hardness, KHN$_{25}$ | 8.0 | 9.5 | 11.7 | 12.4 |
| MEK rubs, mar | 20 | 50 | 25 | 25 |
| remove | 200+ | 200+ | 200+ | 200+ |
| Yellowness Index | | | | |
| Original | −1.0 | −0.7 | 2.6 | 9.3 |
| 1st Overbake | −0.5 | 0.1 | 4.3 | 11.1 |
| 2nd Overbake | −0.3 | 0.5 | 5.6 | 12.6 |
| 3rd Overbake | 0.0 | 1.1 | 7.0 | 14.2 |

*Titanium dioxide pigment.
**para-toluene sulfonic acid.

EXAMPLE 4

The general procedure of EXAMPLE 2 was repeated using a self-crosslinking oxime-blocked polyisocyanate obtained by copolymerizing meta-isopropenyl-alpha, alpha dimethylbenzyl isocyanate (m-TMI) blocked with methyl ethyl ketone oxime (MEKO) and hydroxyethyl acrylate, butyl acrylate, and methyl methacrylate as the blocked polyisocyanate ingredient in the clear top coat formulation with (Formulation H) and without (Formulation I) the imino-functional amino resin CYMEL® 323.

The base coat formulation contained JONCRYL® 500 acrylic resin, CYMEL® 303 resin, titanium dioxide pigment and, as a cure catalyst, p-toluene sulfonic acid.

The base coat was applied to Bonderite 100 CRS panels, and cured at 110° C. for 30 minutes. Thereafter, each top coat formulation H and I, in an organic coatings solvent at 50% solids level, was applied to each base coated panel and cured at 125° C. for 30 minutes. The composition of the formulations H and I and the physical and resistance properties of the cured base coat/clear coat films are summarized in TABLE 4.

It is evident from the results of TABLE 3 that the presence of small amounts of an imino-functional amino resin such as CYMEL® 323 (Coating H) prevents yellowing. In contrast, the coating with no imino-functional resin present (Coating I) had unacceptable levels of yellowness upon cure.

TABLE 3

MEKO-BLOCKED TMI* SELF-CROSSLINKING COPOLYMERS ADDITION OF IMINO-FUNCTIONAL MELAMINE RESIN TO A URETHANE CLEAR TOP COAT TO IMPROVE YELLOWING RESISTANCE

| FORMULATION | H | I |
|---|---|---|
| CLEAR COAT | | |
| MEKO-TMI copolymer* | 100.0 | 100.0 |
| CYMEL ® 323 resin | 9.0 | 0.0 |
| UL-28 (Dimethyltindilaurate) | 0.5 | 0.5 |
| BASE COAT | | |
| JONCRYL ® 500 | 65.0 | 65.0 |
| CYMEL ® 303 resin | 35.0 | 35.0 |
| TIO$_2$ Pigment | 100.0 | 100.0 |
| PTSA (p-toluenesulfonic Acid) | 0.3 | 0.3 |
| CURE SCHEDULE | | |
| Base Coat: 110° C. x 30 Min. | | |
| Clear Coat: 125° C. x 30 Min. | | |
| COATING PERFORMANCE | | |
| Thickness, mils | 1.5 | 1.5 |
| Thickness, mm | 0.038 | 0.038 |
| Hardness, KHN$_{25}$ | 10.3 | 10.1 |
| MEK rubs | 200+ | 200+ |
| Yellowness Index | | |
| Original | -0.5 | 2.3 |
| 1st Overbake (125° C. x 30 Min) | 0.4 | 4.6 |
| 2nd Overbake (125° C. x 30 Min) | 0.9 | 5.9 |

*MEKO-TMI/HEA/BA/MMA/ = 15/20/30/35 (mole ratio); MEKO is methyl ethyl ketone oxime. TMI is meta-isopropenyl-alpha, alpha-dimethylbenzyl isocyanate, a product of American Cyanamid Company, Wayne, New Jersey, available under the tradename TMI ® (meta) Unsaturated Aliphatic Isocyanate; HEA is hydroxyethyl acrylate; BA is n-butyl acrylate; MMA is methylmethacrylate.

EXAMPLE 5

The procedure of EXAMPLE 2 was repeated to prepare coatings J and K using the corresponding formulations described in TABLE 4.

Coating performance and physical properties of the coatings are summarized in TABLE 4.

It is evident from the results in TABLE 4 that replacing about 7.7 weight percent of CYMEL® 303 resin with an imino-functional CYMEL® 327 resin (Coating K) improves the intercoat adhesion (5 versus 0). It also improves the yellowness resistance by lowering the Yellowness Index of the coating (compare Yellowness Index of Coatings J and K), particularly under overbake conditions.

TABLE 4

EFFECT OF ADDITION OF AN IMINO-FUNCTIONAL AMINO RESIN TO THE BASE COAT

| FORMULATION | J | K |
|---|---|---|
| Base Coat | | |
| JONCRYL ® 500 acrylic resin | 65 | 60 |
| CYMEL ® 303 resin | 35 | 5 |
| CYMEL ® 327 resin | 0 | 35 |
| TIO$_2$ Pigment | 100 | 100 |
| pTSA (p-toluene sulfonic acid) | 0.3 | 0.3 |

TABLE 4-continued

EFFECT OF ADDITION OF AN IMINO-FUNCTIONAL AMINO RESIN TO THE BASE COAT

| FORMULATION | J | K |
|---|---|---|
| Top Coat | | |
| TA39-14* | 56.3 | 56.3 |
| BI-12 | 43.7 | 43.7 |
| UL-28 (Dimethyltin dilaurate) | 0.5 | 0.5 |
| CURE SCHEDULE | | |
| Base coat: 125° C. for 30 minutes | | |
| Top coat: 125° C. for 30 minutes | | |
| COATING PERFORMANCE | | |
| Top Coat: Film Thickness, mils | 1.6 | 1.6 |
| Film Thickness, mm | 0.041 | 0.041 |
| Top Coat: Film Hardness, KHN$_{25}$ | 9.3 | 9.4 |
| Yellowness Index | | |
| Initial (125° C. x 30 Min) | 0.1 | -1.2 |
| 1st Overbake (125° C. x 60 Min) | 1.0 | -0.6 |
| 2nd Overbake (125° C. x 90 Min) | 1.7 | -0.6 |
| Intercoat Adhesion | 0 | 5 |

ABBREVIATIONS: *TA39-14 = a hydroxy-functional acrylic resin, a product of DOCK Resins, Inc.

EXAMPLE 6

The procedure of EXAMPLE 2 was repeated to prepare coatings L and M using the corresponding formulations (TABLE 5).

"Wet on wet" base coat/top coat systems were prepared as follows: each solvent-based formulation was applied onto CRS panels and the resulting base coated panels were allowed to dry at room temperature for about 30 minutes. The top coat was then applied onto the partially dried base coat without distorting the surface. This was accomplished by placing aluminum foil layers adjacent the partially dried base coat panels to hold the wire cator in a position just above the base coat during application of the top coat, thus permitting the preparation of a "wet on wet" base coat/top coat system without distorting the partially cured base coat.

The coating performance is summarized in TABLE 6.

It is concluded from TABLE 5 that:

(a) base coats containing imino-functional resins such as CYMEL® 323 may be cured without the addition of external acids because small amounts of acid present in the acrylic component are sufficient to effect cure;

(b) base coats containing imino-functional resins have better yellowing resistance than those having no imino-functional amino resins, particularly under "wet on wet" conditions.

TABLE 5

ADDITION OF AN IMINO-FUNCTIONAL MELAMINE RESIN TO THE BASE COAT TO REDUCE YELLOWING "WET ON WET" BASE COAT/URETHANE TOP COAT

| FORMULATION | L | M |
|---|---|---|
| Base Coat: | | |
| ACRYLIC 145* | 7.5 | 0 |
| QR 1295** | 0 | 75 |
| CYMEL ® 323 | 25 | 0 |
| CYMEL ® 303 | 0 | 25 |

TABLE 5-continued

ADDITION OF AN IMINO-FUNCTIONAL MELAMINE
RESIN TO THE BASE COAT TO REDUCE YELLOWING
"WET ON WET" BASE COAT/URETHANE TOP COAT

| FORMULATION | L | M |
|---|---|---|
| TiO$_2$ Pigment | 100 | 100 |
| DDBSA**** | | 0.75 |
| Top Coat: | | |
| TA 39-14*** | 56 | 56 |
| BI 12 | 44 | 44 |
| UL-28 (Dimethyltin dilaurate) | 0.5 | 0.5 |
| CURE SCHEDULE | | |
| Wet on Wet, Baked at 125° C./30 minutes. | | |
| COATING PERFORMANCE | | |
| COATING | | |
| Thickness, mils | 2.5 | 2.5 |
| Thickness, mm | 0.064 | 0.064 |
| Hardness, KHN$_{25}$ | 12.4 | 7.3 |
| MEK Rubs | 200+ | 150/200+ |
| Yellowing Index | | |
| Original (125° C. × 30 Min) | −3.1 | 0.7 |
| 1st Overbake (125° C. × 60 Min) | −2.7 | 2.4 |
| 2nd Overbake (125° C. × 90 Min) | −2.5 | 3.7 |
| 3rd Overbake (125° C. × 120 Min) | −2.3 | 5.6 |

*Acrylic 145 = a hydroxy-functional acrylic resin, prepared by American Cyanamid Co., Wayne, New Jersey. Acrylic 145 has an acid number of about 20.
**QR 1295 = a hydroxy-functional acrylic resin, a product of Rohm and Haas Company.
***TA 39-14 = a hydroxy-functional acrylic resin, a product of DOCK Resins, Inc.
**** DDBSA = Dodecylbenzenesulfonic acid cure catalyst.

Although the present invention has been described with reference to certain preferred embodiments, it is apparent that modifications and variations thereof may be made by those skilled in the art without departing from the scope of this invention as defined by the appended claims.

We claim:

1. A method of coating a substrate comprising the steps of:
   (a) applying onto the substrate an acid-curable coating composition containing an acidic component as acid catalyst;
   (b) at least partially curing the acid-curable coating composition to produce a first layer;
   (c) applying, onto the first layer, an adjacent coat of a curable one-package polyurethane coating composition comprising a resin-forming component comprising:
       (i) a blocked polyisocyanate,
       (ii) an isocyanate-reactive material, and
       (iii) an imino-functional amino resin having an average —NH— content of about 3.0 percent by weight or higher; and thereafter
   (d) curing said one-package polyurethane coating composition to produce a coated substrate having an acid-cured first layer and a polyurethane adjacent layer.

2. The method of claim 1, wherein the blocked polyisocyanate is oxime-blocked.

3. The method of claim 1, wherein the polyisocyanate is selected from the group consisting of hexamethylene diisocyanate, 3-isocyanatomethyl-3,5,5-trimethylcyclohexyl isocyanate, m-isopropenyl-alpha, alpha-dimethylbenzyl isocyanate copolymers, 1,3-tetramethylxylylene diisocyanate, trimethylol propane adducts thereof, trimerized isocyanurate derivatives thereof, and a mixture of the preceding polyisocyanates.

4. The method of claim 1, wherein the isocyanate reactive material is selected from the group consisting of hydroxy-functional polyesters, hydroxy-functional polyacrylates and hydroxy-functional polyurethane prepolymers.

5. The method of claim 1, wherein the imino-functional amino resin is selected from the group consisting of imino-functional melamines, guanamines, glycolurils, ureas, and a mixture thereof.

6. The method of claim 5, wherein the imino-functional amino resin is derived from monomeric or oligomeric hydroxymethylated, alkoxymethylated, or a mixture of hydroxymethylated and alkoxymethylated amino resins selected from the group consisting of melamines, guanamines, glycolurils and ureas.

7. The method of claim 1, wherein the imino-functional amino resin has an average —NH— content in the range of from about 3.0 to about 35.7 weight percent.

8. The method of claim 1, wherein the one-package polyurethane coating composition comprises from about 0.1 weight percent to about 30 weight percent of the imino-functional amino resin, based on the weight of the resin-forming component.

9. The method of claim 1, wherein the stoichiometric ratio of the blocked polyisocyanate groups and isocyanate-reactive groups in the one-package polyurethane coating composition is in the range of from about 1.2:1 to about 0.8:1.

10. The method of claim 1, wherein the one-package polyurethane coating composition further comprises a cure catalyst.

11. The method of claim 1, characterized in that the acid-curable coating composition comprises, as a crosslinker, an amino resin selected from the group consisting of substantially fully alkoxymethylated amino resin, an imino-functional amino resin, and a mixture thereof.

12. The method of claim 1, characterized in that the acid-curable coating composition comprises, as the acid catalyst, a strong acid catalyst having a pK$_a$ of less than 5.

13. The method of claim 1, wherein the one-package polyurethane coating composition is applied wet on wet onto said first layer.

14. The method of claim 1, wherein the curable one-package polyurethane coating composition is a clear coat.

15. The method of claim 1, wherein the resin-forming component of the one-package polyurethane coating composition consists essentially of (i) the blocked polyisocyanate, (ii) the isocyanate-reactive material, and (iii) the imino-functional amino resin.

16. The method of claim 1, wherein the substrate is metal.

17. A coated substrate comprising:
   (1) a first acid-cured layer derived from an acid-curable coating composition containing an acidic component as acid catalyst; and
   (2) a cured polyurethane adjacent layer derived from a one-package polyurethane coating composition comprising a resin-forming component comprising:
       (i) a blocked polyisocyanate,
       (ii) an isocyanate-reactive material, and
       (iii) an imino-functional amino resin having an average —NH— content of about 3.0 percent by weight or higher.

18. The coated substrate of claim 17, wherein the blocked polyisocyanate is oxime-blocked.

19. The coated substrate of claim 17, wherein the polyisocyanate is selected from the group consisting of hexamethylene diisocyanate, 3-isocyanatomethyl-3,5,5-trimethylcyclohexyl isocyanate, m-isopropenyl-alpha, alpha-dimethylbenzyl isocyanate copolymers, 1,3-tetramethylxylylene diisocyanate, trimethylol propane adducts thereof, trimerized isocyanurate derivatives thereof, and a mixture of the preceding polyisocyanates.

20. The coated substrate of claim 17, wherein the isocyanate reactive material is selected from the group consisting of hydroxy-functional polyesters, hydroxy-functional polyacrylates and hydroxy-functional polyurethane prepolymers.

21. The coated substrate of claim 17, wherein the imino-functional amino resin is selected from the group consisting of imino-functional melamines, guanamines, glycolurils, ureas, and a mixture thereof.

22. The coated substrate of claim 21, wherein the imino-functional amino resin is derived from monomeric or oligomeric hydroxymethylated, alkoxymethylated, or a mixture of hydroxymethylated and alkoxymethylated amino resins selected from the group consisting of melamines, guanamines, glycolurils and ureas.

23. The coated substrate of claim 17, wherein the imino-functional amino resin has an average —NH— content in the range of from about 3.0 to about 35.7 weight percent.

24. The coated substrate of claim 17, wherein the one-package polyurethane coating composition comprises from about 0.1 weight percent to about 30 weight percent of the imino-functional amino resin, based on the weight of the resin-forming component.

25. The coated substrate of claim 17, wherein the stoichiometric ratio of the blocked polyisocyanate groups and isocyanate-reactive groups in the one-package polyurethane coating composition is in the range of from about 1.2:1 to about 0.8:1.

26. The coated substrate of claim 17, wherein the one-package polyurethane coating composition further comprises a cure catalyst.

27. The coated substrate of claim 17, wherein the acid-curable coating composition comprises, as a crosslinker, an amino resin selected from the group consisting of substantially fully alkoxymethylated amino resin, an imino-functional amino resin, and a mixture thereof.

28. The coated substrate of claim 17, characterized in that the acid-curable coating composition comprises, as the acid catalyst, a strong acid catalyst having a $pK_a$ of less than 5.

29. The coated substrate of claim 17, wherein the cured polyurethane adjacent layer has been derived by applying the one-package polyurethane coating composition wet on wet onto said first layer, then curing the one-package polyurethane coating composition.

30. The coated substrate of claim 17, wherein the curable one-package polyurethane coating composition is a clear coat.

31. The coated substrate of claim 17, wherein the resin-forming component of the one-package polyurethane coating composition consists essentially of (i) the blocked polyisocyanate, (ii) the isocyanate-reactive material, and (iii) the imino-functional amino resin.

32. The coated substrate of claim 17, wherein the substrate is metal.

* * * * *